INVENTOR
L. ESPENSCHIED
BY E. V. Griggs
ATTORNEY

May 15, 1951 L. ESPENSCHIED 2,553,245

ELECTRONIC TRACING SYSTEM

Filed June 4, 1946 2 Sheets-Sheet 2

INVENTOR
L. ESPENSCHIED
BY E. V. Griggs
ATTORNEY

Patented May 15, 1951 2,553,245

UNITED STATES PATENT OFFICE 2,553,245

ELECTRONIC TRACING SYSTEM

Lloyd Espenschied, Kew Gardens, N. Y., assignor to Bell Telephone Laboratories, Incorporated, New York, N. Y., a corporation of New York Application June 4, 1946, Serial No. 674,395

11 Claims. (Cl. 178—18)

Figures 1, 3:
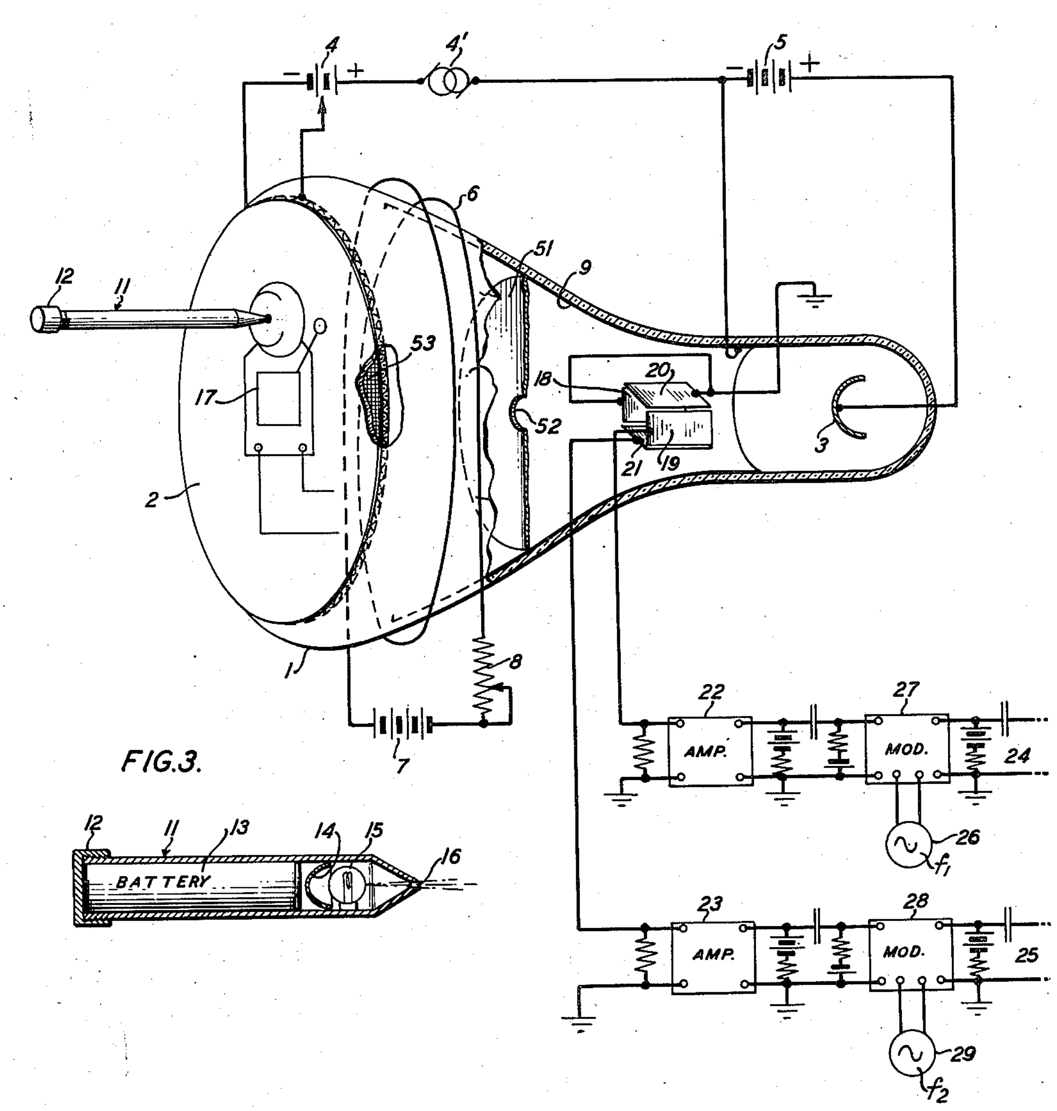

This invention relates to tracing systems and, more particularly, to systems for transmitting writing or sketches or other graphical material to a remote receiving station while it is being drawn at a transmitting station.

An object of the invention is to provide a transmission system capable of transferring information as does a telautograph but in which the transmitting stylus may be wholly free from mechanical constraints so that the operator or user of the stylus is in no way fettered in his operation of the device.

A feature of the invention is the use of a radiant or optical coupling between the stylus and the electrical transmitting system thus eliminating the pull cords or other mechanical connections or constraints of the well-known telautograph.

Another object of the invention is to transmit graphs and images with a minimum of mechanisms or moving parts.

A still further object of the invention is to transmit information of graphic type without the necessity of scanning an area, a large percentage of which may be blank.

An additional object of the invention is to enable transmission of graphic information without the necessity of sending synchronizing signals or of synchronizing a remote receiver with the transmitter.

A still further object of the invention is to reduce the frequency range required for graphic transmission over that required for scanning the whole area occupied by the graph.

In accordance with one embodiment of the invention a cathode ray tube at the transmitting station is provided with a large area photosensitive cathode of the general type used in television picture pickup tubes, an electron target and an electron beam collimating device between the cathode and target. The cathode is formed as a coating on the inner surface of a relatively large semi-transparent wall of the cathode ray tube. The graph or pattern to be transmitted is traced by a manually operated stylus which does not actually contact with the semi-transparent wall but which throws a beam of light on the exterior surface thereof thus releasing electrons in a stream at the region of incidence of the light beam upon the cathode. The electron stream is concentrated or collimated and on its way to the target passes between four plates resembling the usual deflectors of a cathode ray oscilloscope. The stream induces charges on the plates and gives rise to potential differences between the opposite plates of each pair which vary in polarity and magnitude in accordance with the instantaneous position of the electron stream between the plates. Electromotive forces are derived from each pair of plates which are indicative of the instantaneous position of the electron stream and their energies, after transmission in any desired fashion to the remote receiving station, are there caused to excite reflector plates of a cathode ray receiving tube of the usual oscilloscope type thus reproducing on the luminescent screen of the receiving tube a pattern or picture which is a duplicate of that originally produced by the light beam stylus at the transmitting station.

Figure 2:
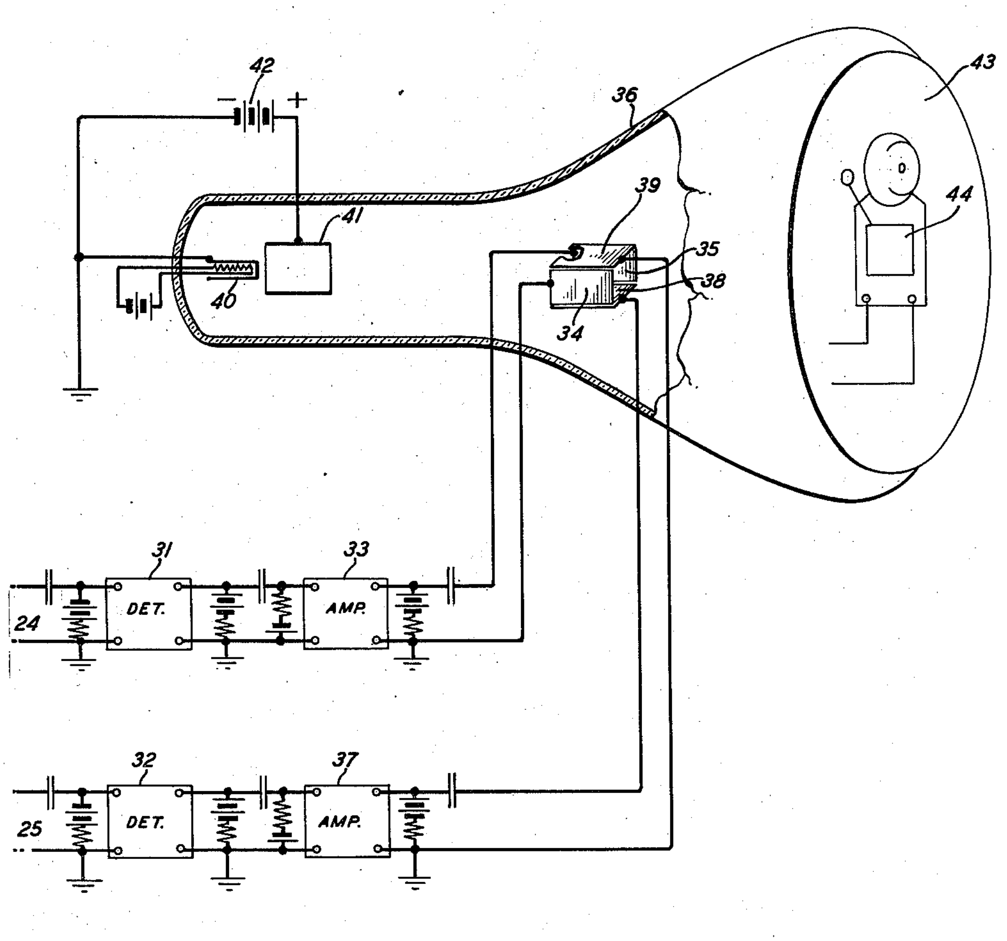

In the drawing which illustrates one embodiment of the invention Fig. 1 presents schematically a transmitting apparatus Fig. 2, the remote receiver which cooperates with the transmitter of Fig. 1 and Fig. 3 shows details of the stylus used with the transmitter of Fig. 1.

Referring to Fig. 1, the transmitting apparatus comprises a cathode ray tube 1 with associated circuits by which position indicating electromotive forces derived from the tube 1 may be transmitted to the receiver. The tube 1 is provided with a large substantially plane end surface 2 of translucent material, the inner face of which is coated with photosensitive electron-emitting substance which, under the excitation of light, emanates electrons at the region of incidence of the light. At the opposite end of the tube a target 3 is polarized positively with reference to the cathode by means of sources 4 and 5 which are connected between the cathode 2 and the target 3 over an external conductive path. The space current source 4 is supplemented by an alternating current generator 4′ the function of which is to impart an interruption to the electron beam emanating from the surface 2, as will be better appreciated subsequently. To increase the initial velocity of the electrons emitted from the cathode surface 2 there may be positioned near its inner surface a coextending grid 53 which is positively polarized with respect to the cathode. In order to collimate the beam of electrons a magnetic field coil 6 is arranged in series with source 7 and variable resistor 8 to surround tube 1 and to set up therein a longitudinal magnetic field. The collimating effect of the magnetic field is enhanced by an electrically conductive shield and anode member 9 which serves both to accelerate the electrons emitted from the cathode 2 and to shield the electrons from external influences which might affect them over a considerable portion of the course of their travel from the cathode 2 to the target 3. The anode 9 is illustrated diagrammatically in Fig. 1 as a tapered cylinder but it may, in fact, be a coating of electrically conductive material such as silver on the inner surface of the wall of the cathode ray tube.

A transmitting stylus 11 in the form of a tube (see Fig. 3) closed at one end by a cap 12 and containing a battery 13, a parabolic mirror reflector 14 and a filament or other light source 15 connected to the battery 13 serves to produce a beam of light which is projected through the opening 16. When the stylus 11 is manipulated to trace on the exterior surface of the cathode 2 a diagram or graphic representation such as that indicated at 17, the light passing through the transparent end surface bearing the cathode 2 causes the release at the point of incidence on the inner cathode surface of a stream of electrons which is directed by the internal electrostatic field toward the anode 9 and the target or collector 3. Instead of, or in addition to visible light, the stylus may be provided with other sources of radiation, such as ultra violet or even radium emanation, capable of effecting the release of electrons from the cathode surface.

This induction is enhanced, and is made to obtain also for a fixed position of the scribing pencil on the electron-emitting screen by the interruption or amplitude modulation of the electron beam imparted by the alternating current generator 4'. As a part of the anode 9 there may be provided an integrally connected shielding disc 51 having a central aperture 52. The collimating effect of the magnetic field produced by the coil 6 and of the electrostatic field produced by the anode 9 tends to concentrate the beam of electrons and to cause it to pass through a space bounded by four conducting plates 18, 19, 20 and 21 which are arranged in the well-known fashion of the usual deflector plates of a cathode ray oscilloscope. The effect of the electron stream in passing through the space enclosed by the plates 18, 19, 20 and 21 is to induce charges on these plates in varying degree in accordance with the proximity of the stream to the plates. The aperture 52 of the shielding disc 51 is designed to be small enough to restrict the electron beam to a zone such that it does not contact with the plates 18, 19, 20 and 21 but sufficiently large, however, to enable it to deflect through the major portion of the area encompassed by those plates. This gives rise to a potential difference between the plates 18 and 19 of one pair and a potential difference between the plates 20 and 21 of the other pair since the charge induced on the nearer plate is greater than that induced on the more remote plate. It transpires, therefore, that the potential difference of each pair of plates will vary in magnitude and in polarity as the electron beam shifts first toward one plate and then toward the opposite plate of the pair.

The plates 18 and 19 are respectively connected to the opposite input terminals of an amplifier 22 and the plates 20 and 21 are similarly connected to the opposite input terminals of an amplifier 23. The amplified currents from the output terminals of these amplifiers may be separately transmitted over independent circuits 24 and 25 or these currents, before transmission, may be made to modulate high frequency carrier waves as indicated in the drawing in which a source 26 associated with a modulator 27 is connected to the output of the amplifier 22 in well-known manner to cause carrier waves of the frequency $f_1$ produced by the source 26 to be modulated by the potential differences between the plates 18 and 19 and after modulation to be transmitted over the line 24 to the remote station. In similar manner, the potential difference between plates 20 and 21 after amplification by amplifier 23 may be impressed upon modulator 28 to modulate carrier waves of frequency $f_2$ supplied thereto by carrier wave source 29, the resulting modulated carrier waves being transmitted over the circuit 25 of the tube to the remote receiving station. The modulators 27 and 28 may be frequency-modulators, in which case the signals of variable amplitude are transmitted as variations of frequency.

The end of the tube carrying the cathode 2 must be transparent or, at least, semi-transparent to permit sufficient light to pass through to release electrons from the inner photosensitive surface. The cathode may include an extremely thin and hence a transparent film of silver or other electrically conducting material to enable the negative terminal of the source 4 to be effectively connected to the entire cathode. The potentiometer 8 permits variation of the current passing through the coil 6 and hence of the longitudinally directed magnetic field which assists in collimating the electron stream.

At the receiving station shown in Fig. 2, the modulated currents received over lines 24 and 25 are detected by detectors 31 and 32 of well-known type to produce detected currents which correspond in wave form to the position indicating currents impressed upon amplifiers 22 and 23 respectively from the charge collecting plates 18, 19, 20 and 21. After amplification by amplifier 33 of the positional currents derived from the output of detector 31 these positional currents are utilized to set up a deflecting electromotive force between the plates 34 and 35 of the cathode ray tube 36. In similar fashion, the positional currents derived from the detector 32 and amplified by the amplifier 37 are applied to the deflector plates 38 and 39 of the cathode ray tube 36. The cathode ray tube 36 includes the usual cathode structure 40 and tubular anode 41 constituting an electron gun, the electron impelling field being derived from the source 42 which is connected in an external path between the electrodes 40 and 41. It follows that the electron beam emitted from the electron gun and which passes through the space impressed by the deflecting electrodes 34, 35, 38 and 39 is deflected electrostatically as in the well-known cathode ray oscilloscope to produce in its incidence on the oscilloscope screen a graph or diagram 44 corresponding substantially to the graph 17 of Fig. 1.

It is, of course, unnecessary to use individual transmission lines since the modulated carrier waves, if their frequencies $f_1$ and $f_2$ be sufficiently separated, may readily be transmitted over a common transmission line and separated by filters in well-known manner. Moreover, in lieu of the transmission lines 24 and 25 individual radio channels or a common radio channel may be employed, in the latter case, the modulated waves of frequency $f_1$ and $f_2$ being used to modulate the principal radio carrier frequency wave.

It will, therefore, be apparent that the transmitting operator is entirely free to transmit diagrams or other graphic material at will with no hindrance or constraint being imposed since the coupling or control exercised by the stylus 11 is entirely through the beam of light emitted by the stylus. It is, accordingly, possible to transmit considerable information in a relatively short time and with high economy of frequency transmission band since the currents or oscillations transmitted from the transmitting station to the receiving station may all be of significant or indicating value and none, or a very little, of these currents may be transmitted during blank or vacant intervals. Of course, the amount of quantity of information transmitted is dependent to an extent upon the phenomenon of persistence exhibited by the oscilloscope screen 43 but the diagrams, particularly in the case of simple types, may be again rapidly transmitted by the transmitting operator or the receiver screen 43 may be photographed at the receiving station should there be occasion to retain a record of the transmitted graphical information.

What is claimed is:

1. A facsimile system for transmitting graphic information comprising an electron discharge device having a large wall surface, the interior of which is coated with photo-responsive material to constitute an electron emitting cathode, an anode, and means comprising two pairs of pick-up electrodes, the electrodes of each of said pairs positioned adjacent to and on opposite sides of the path of the stream between said cathode and anode and adapted to have induced therein voltages varying with respect to the variation of the stream position relative to said electrodes, means to vary the point of initiation of the stream over the surface of said cathode, and thereby the stream positioned relative to said electrodes, in accordance with graphic information to be transmitted, and means to transmit indications of said voltage variations to a distance.

2. A facsimile transmitter comprising a cathode-ray tube having a relatively large wall which is permeable to light, said wall serving as a writing surface, a radient energy pencil for writing or drawing on said surface, a photo-responsive cathode positioned on the inside of the wall, an anode, two pairs of electrodes, the electrodes of each of said pairs positioned to have pass between them the stream of electrons flowing from said cathode to said anode in response to incident radiation from said pencil on said cathode, said electrodes also positioned to have induced in them voltages representative of the lateral displacements of the electron stream in two coordinates in accordance with variations in the position of the point on the cathode from which the stream emanates, and means for transmitting said voltages for use in reproducing the written or drawn matter.

3. A system for transmission of graphs comprising a transparent plate, the area of which corresponds to that of a graph to be transmitted, said plate having a coating of photo-responsive electron releasing substance on one surface, a source of a restricted pencil of light for tracing a graph upon the opposite surface of the plate and means for initiating an electron stream from that point of the plate which is being illuminated by the pencil, two pairs of electrodes adjacent said stream and positioned to have induced in them voltages varying in accordance with the coordinates of the point on the plate at which the stream is initiated, the electrodes of each of said pairs being positioned on opposite sides of said stream, and means to transmit to a receiving point indications of said voltages.

4. An electrcal wave transmission system comprising an electron discharge device having a cathode of relatively large electron-emitting area, an anode, means for initiating an electron stream from a portion of said cathode and for causing the position of the portion to vary at will as a function of a signal to be transmitted, two pairs of electrodes, the electrodes of each of said pairs positioned on different sides of a space traversed by said stream to have different electromotive forces induced in them depending upon the distance of the stream from the electrode, and means to transmit to a distance for signal reception purposes indications of the electro-motive forces induced in said respective electrodes.

5. Transmitting equipment for graphs comprising a cathode-ray tube having a large wall coated on its interior with photosensitive electron-emissive substance and an electron collecting element, a light beam producing stylus free from external mechanical or electrical connections and constraints adapted for movement over said coated wall to trace graphic symbols thereon, thereby releasing a stream of electrons from said emissive substance which stream follows spatially the moving stylus, two pairs of induction members positioned about the space traversed by said stream between said substance and said collecting element, each of said pairs positioned to have said stream pass between them and adapted to have produced in them voltage variations representative of the instantaneous location of said stream cross-wise of said space, and means for deriving from said members and transmitting to a distance voltage variations indicative of the movements of said stylus in tracing said symbols.

6. A transmitter of graphic information comprising an evacuated container, a photoresponsive cathode element having a large surface area mounted therein, an anode spaced from said cathode, two pairs of plates arranged generally parallel to the axis of the electron beam from said cathode to said anode, each pair being positioned with one plate on one side of the beam and the other on the other, the two pairs of plates being respectively parallel to planes which are perpendicular to each other, means for subjecting the cathode to a beam of light, the point of incidence of which varies at will in accordance with graphic information to be transmitted and a graphic information transmitting circuit connected to each pair of plates to derive therefrom an electromotive force representing one coordinate of the position of the point of incidence.

7. The method of transmitting graphic information which comprises producing a luminous graph by causing a beam of light to traverse any course selected at will upon a surface, translating the beam of light into an electron stream emanating from a point corresponding to and determined by the point on said surface currently being traversed by the beam, translating vertical and horizontal components of movement of said electron stream into separate electrical variations, and transmitting said variations to a distance.

8. In the use of an electronic tube having a translucent plate the inner face of which is coated with photosensitive electron emitting substance for translating graphic information, the method comprising tracing on said plate symbols with a pencil of radiant energy, thereby causing emission from the inner face of the plate of electrons in a stream originating at the point on the face upon which the pencil is at the time incident and moving across the face as the pencil moves, projecting said stream away from the emitting face of the plate, and deriving by voltage induction from the projected stream voltage variations indicative of vertical and horizontal components of the movements of the stream in a plane parallel to said face.

9. In a system for the transmission of graphic information, an electron discharge device comprising a large area photosensitive mosaic positioned adjacent a writing surface, writing means adapted to produce photo-emission of electrons from a limited portion of said mosaic, an anode, means for focussing the electrons emitted from said mosaic into a stream proceeding from said mosaic to said anode, means comprising at least two pairs of electrodes positioned adjacent the path of flow of said electron stream, one pair of electrodes coupled to the stream to derive voltages induced by one component of cross-wise movement of the stream and the other electrode coupled to the stream to derive voltages induced by another component of such movement, said pairs each positioned to have said stream pass between them, and circuits for transmitting said induced voltages to produce electrical signals whose magnitude is representative of the position of said writing means on said writing surface.

10. A facsimile transmitter comprising an electron tube having a large area cathode, means to form a signal for transmission comprising means to move the cathode end of an electron stream at will from point to point over the surface of said cathode, means to map the movements of such end of the stream comprising means to measure in each of two coordinate directions the components of the stream movements, said last-named means comprising two pairs of electrodes, the electrodes of each of said pairs positioned on opposite sides of said stream and adapted to have induced in them voltages indicative of the lateral displacement of said stream in one coordinate, and means to transmit the measured components to a receiving point to reconstruct the signal.

11. In an electrical wave transmission system, an electron discharge device having a large area photo-sensitive cathode, an anode, a potential source connected between said cathode and said anode, tracing means for initiating a flow of electrons to said anode from any portion of said cathode, pickup electrodes adjacent the path of electron flow for producing electrical signals representative of the position of said tracing means, and means for varying the potential difference applied between said cathode and said anode in a recurrent manner whereby the pickup effect of said pickup electrodes is enhanced.

LLOYD ESPENSCHIED.

REFERENCES CITED

The following references are of record in the file of this patent:

UNITED STATES PATENTS

| Number | Name | Date |
|---|---|---|
| 2,000,014 | Du Mont | May 7, 1935 |
| 2,200,749 | Kemp | May 14, 1940 |
| 2,367,277 | Henroteau | Jan. 16, 1945 |
| 2,372,450 | Rajchman | Mar. 27, 1945 |
| 2,451,000 | Smith | Oct. 12, 1948 |
| 2,515,057 | Pierce | July 11, 1950 |